Patented Jan. 3, 1950

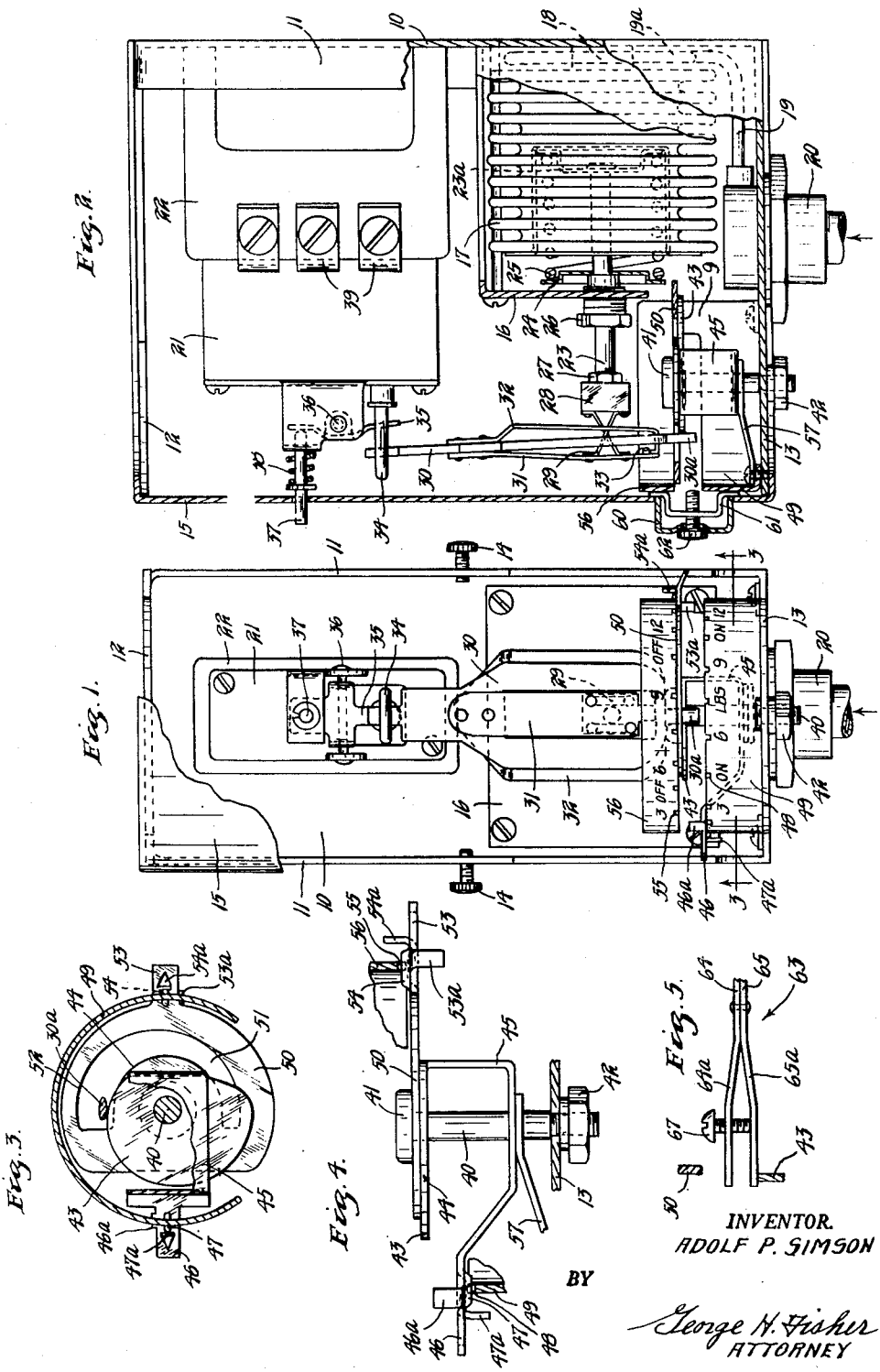

2,493,323

UNITED STATES PATENT OFFICE 2,493,323

CONTROL DEVICE

Adolf P. Simson, Minneapolis, Minn., assignor to Minneapolis-Honeywell Regulator Company, Minneapolis, Minn., a corporation of Delaware Application February 23, 1946, Serial No. 649,596

10 Claims. (Cl. 200—83)

1

My invention relates to a control device of the type wherein a switch is actuated in response to variations of a condition, such for illustration, as temperature or pressure. One of the important features of the invention resides in means for adjusting the limit of movement of a member which is susceptible to movement in two directions. Another feature resides in means for compensating for minor variations in the structure of certain parts of the device.

In a control device of this character it is customary that the condition under which the movable member moves in one direction differs from the condition under which it moves in the opposite direction. To give wide utility to such a device it is desirable that the operating differential be variable in each direction, and that each differential adjusting means be adapted to operate independently of the other. One of the important features of the present invention is that the differential adjustment is made by two members which are mounted on a common axis, which may for example be the central axis of each of the members. Each of the differential adjusting means is provided with a surface against which the movable member will abut when moving in one direction and serves as a limiting means to prevent further movement of the movable member in that particular direction. To provide adjustment, each of the members is also adapted for rotation about the common axis so that the respective surfaces, which may be regarded as cam surfaces, are adjustable independently of each other. An advantage of this particular arrangement of the differential adjusting means results in the conservation of space within the control device upon which it is used.

Another feature of the invention is that in control devices of this general nature, minor variations in certain parts of the device will inevitably occur and will cause a certain amount of difficulty in properly calibrating the device. For example, in the present device a pressure motor is made up of a bellows and a return spring which opposes the action of the bellows in one direction. It frequently occurs in forming bellows or springs of this general nature that minor variations in the flexibility or spring rate will occur and will cause considerable difficulty in properly calibrating the device. In order to correct for these deviations the switch actuating member in one modification of the present invention is made in the form of a split lever with an adjusting means between two of the parts of the lever to aid in the factory adjustment of the device.

One object of the invention is to provide, in a control device having a member movable in two directions in response to a differential condition, improved means whereby the operating differential may be readily varied in both directions and wherein each differential adjusting means is adapted to operate independently of the other.

Another object is to provide two differential adjusting members rotatably mounted on a common axis of rotation in such a manner that the differential range is provided by one variable surface of each of the members.

Another object is the provision, in an operating mechanism, of adjustment means in combination with a lever for operating a switch whereby minor variations in parts of the mechanism such as springs or other elements may be adjusted to compensate for the variation.

A further object is to provide two cam members rotatable on a common axis and an adjustable switch actuating lever movable between an external surface of one of the cam members and an internal surface of the other cam member.

Other and further objects will become apparent from the following description and claims, and from the appended drawing in which:

Figure 1 is a top plan view of a pressure operated switching mechanism, with certain parts broken away;

Figure 2 is a side elevation of the device shown in Figure 1;

Figure 3 is a detailed cross-sectional view taken on the line 3—3 of Figure 1 with certain parts broken away;

Figure 4 is an enlargement of the mechanism shown in Figure 3 with the figure rotated 90 degrees toward the reader; and, Figure 5 is a modification of a portion of the switch operating lever shown in Figures 1, 2 and 3.

Referring now to the drawing and particularly to Figures 1 and 2, the device will be explained in detail. Reference numeral 10 indicates a base member having marginal walls 11 and upturned end walls 12 and 13. Fastening means 14, which may be of a tamper-proof nature, are located in the side walls 11 and are utilized for securing a cover member 15 to the base 10. Mounted within an inner casing 16 is a pressure motor which includes an inverted cup-type of bellows structure 17. At the right side of bellows 17 as seen in Figure 2, a connection 18 receives a capillary tube 19 which is coiled in the form of a "pigtail" as indicated by reference numeral 19a to trap fluid used in operating bellows 17. Since it is frequently necessary to use a "pigtail" in connecting devices of this general nature, by enclosing the "pigtail" within the casing, the appearance of the device is considerably enhanced. At its other end tube 19 is joined to a connection 20 which is in turn adapted for connection to a source of fluid under pressure, such as steam for example. Movement of bellows 17 in response to variations of fluid pressure communicated through connection 20 is utilized to operate an electric snap switch 21 that is supported on base 10 by means of a bracket 22. Snap switch 21 is a two-position switch which tends to remain in the position to which it has been actuated and is more fully disclosed in Patent 2,318,734, granted to Albert E. Baak and assigned to the assignee of the present application.

A rod 23 is connected at one end to a bracket 23a situated on the outer surface of the inverted cup portion of bellows 17. Surrounding rod 23 between a plate 24 that is removably mounted on rod 23 and bracket 23a is a compression spring 25 that is provided to give a positive return action to rod 23 upon a drop in pressure within bellows 17. A particular feature of spring 25 is that it may be selected for the particular range of pressure to which the device is to be adapted and it may be readily removed and replaced to adapt the device for use within different ranges of pressure. Rod 23 is journaled in a bushing 26 on the top of inner casing 16 and is threadedly secured at its outer end to a rectangular block 28 by a locknut 27 that is threadedly rotatable on shaft 23. Mounted on the left face of block 28 are two legs of a crossed reed pivot 29 which are connected at their opposite ends to a spring 31. At one end spring 31 is connected to a floating lever 30 which is the main operating lever of the device. Situated on the right side of lever 30 is another spring 32 which is riveted at one end to lever 30, and on its opposite end is provided with a U-shaped portion 33 that abuts spring 31. Springs 31 and 32 serve as a strain release connection between the pressure motor and the main operating lever, to prevent injury to parts of the device upon excessive movement of the pressure motor in one direction or the other. At one end lever 30 loosely projects through an opening of an actuating stem 34 which controls the operation of snap switch 21. At its opposite end, a narrow projection 30a, of lever 30 extends between two adjusting members for purposes which will be explained hereinafter. Through a second opening in actuating stem 34 projects one end of a reset lever 35 that is pivoted at 36. A manually operable reset pin 37 which is adapted to engage the opposite end of reset lever 35 extends through cover 15 and is provided with a return spring 38. A plurality of terminal connectors 39 are located on opposite sides of switch 21 for connection to a source of power and a device or mechanism controllable by the action of switch 21.

To provide for the differential adjustment of the movement of projection 30a of lever 30, two rotatable cam members are generally shown in Figures 1 and 2 and are shown in greater detail in Figures 3 and 4. A stationary rod 40 having an enlargement 41 on one end thereof, is secured by its other end in the wall portion 13 by a nut 42. Rotatably mounted on rod 40 is a first cam member shown as a solid disk 43, which is provided with an exterior eccentric cam surface 44. Connected to disk 43 is a yoke 45 which extends to a manually operable portion 46. Member 46 is provided with a bent-over stop portion 46a and a detent 47, which cooperates with notches 48 on a cylindrical portion 49 of a member 9, and an index pointer 47a that cooperates with a stamped or printed pressure scale on portion 49 to indicate the "on" setting or low limit of cam member 43. Member 9 is secured to the interior side of end wall 13. Also rotatably mounted on rod 40 between the enlargement 41 and disk 43 is another disk 50 which forms the second cam member and is provided with an elongated slot 51 in its surface. The outer surface of slot 51 is provided with an eccentric cam surface 52. The projection 30a of lever 30 is positioned within slot 51 and is movable between the two cam surfaces 44 and 52 as may be seen in Figure 3. Disk 50 is provided with a manually operable member 53 that extends exterior of casing 15 and corresponds to member 46 of disk 43. Like member 46, member 53 is provided with a bent-over stop portion 53a, a detent 54 which cooperates with notches 55 on a cylindrical portion 56 of member 9 and which is held in engagement therewith by the resiliency of the disk 50, and an index pointer 54a that cooperates with a stamped or printed pressure scale on portion 56 to indicate the "off" setting or high limit of cam 50. The two projections or stop portions 46a and 53a extending respectively from disks 43 and 50 serve to prevent these members from overlapping or being rotated past each other in the wrong direction. It should be noted, however, even in the absence of the stop portions 46a and 53a it would be impossible to rotate these members past each other because of the clamping action against portion 30a of lever 30 which would take place when the distance between the cam surface 44 and cam surface 52 is reduced by selective rotation of the disks 43 and 50. Such manipulation of the members 46 and 53 could result in damage to various parts such as the reeds 29, and it is for this reason that the stops 46a and 53a are provided. The two disks 43 and 50 are resiliently held in engagement on rod 40 against the enlargement 41 by a leaf spring 57 which is mounted on the interior of end wall 13.

In order to prevent the setting of the device from being disturbed by unauthorized persons, a tamper-proof cowling 60 is mounted over the manually operable portions 46 and 53. The cowling 60 is secured to cover 15 by means of a bracket 61 positioned between cover 15 and the index portions 49 and 56, and is secured therein by fastening means 62 which may also be of a tamper-proof nature.

Referring now to Figure 5, there is shown a portion of a modified form of main operating lever indicated by reference numeral 63. It should be understood that lever 63 while not shown in full is capable of being connected to the pressure motor and the switching mechanism in the same general manner as disclosed in Figures 1 and 2. In this modification, the lever 63 consists of two strips of resilient metal indicated by reference numerals 64 and 65, which have bent portions 64a and 65a, and which are riveted together as shown at 66. An adjusting screw 67 threadedly fits into portion 64a and abuts the adjacent surface of portion 65a. Portion 64a is adapted to abut disk 50 and portion 65a is adapted to abut disk 43 in the same general manner as the single portion 30a of lever 30. The purpose of this modification is to partially compensate for variations in parts of the device such for example as the spring rate of spring 25 or bellows 17. When the spring rate of the pressure motor is above normal, the respective portions 64a and 65a are spaced relatively far apart by the adjustment of screw 67, while if the spring rate of the preessure motor is below normal, the portions are spaced relatively close to each other, which by their resilience will occur when screw 67 is loosened.

In operation, the control device is mounted so that connection 20 may be coupled to a source of fluid pressure, such as steam, and the several terminals 39 on both sides of snap switch 21, may be connected to a source of power and a mechanism whose operation is to be controlled by the device in response to a predetermined variation of fluid pressure.

The tamper-proof cowling 60 is temporarily removed to permit adjustment of the manually operable indicators 46 and 53 to appropriate settings on the index portions 49 and 56 of member 9. The lower and upper settings of the two indicating members represent the pressure at which the electric circuit will be initiated and terminated, and the difference between these settings represents the lost motion or differential through which the pressure actuating means may move without affecting the electrical circuit. The coiled portion or "pigtail" 10a of the capillary tube 19 will serve to trap condensate or other fluid in the tube thus preventing live steam or other injurious fluid from entering the interior of the bellows. On the application of sufficient pressure within bellows 17, the bellows will expand against the resilient force of spring 25 to cause rod 23 to move outwardly or to the left as shown in Figure 2 of the drawing. The movement of rod 23 is transmitted through the crossed reed pivot 29 to spring 31, which, since it is made of fairly heavy material, will move lever 30 in unison therewith until the end portion 30a is brought into engagement with cam surface 52. On continued movement of rod 23 the crossed reeds 29 serve as a frictionless pivot about which lever 30 rotates to move actuating stem 34 to the left, causing switch 21 to be actuated to open an electrical circuit. On continued rise of pressure within bellows 17, the spring 31 will move away from the U-shaped portion 33 of spring 32, and by its inherent resilience will serve as a strain release to prevent injury to the mechanism. On a drop of pressure within bellows 17, the spring 25 which is now compressed will cause the action to be reversed, thereby moving the end portion 30a of lever 30 away from cam surface 52 and in the direction of cam surface 44 as a form of lost motion, before the actuating stem 34 is moved to its opposite position. After portion 30a comes into engagement with cam surface 44 the lever 30 rotates on the frictionless pivot 29 in the opposite direction to cause the actuating stem 34 to be moved to the right to initiate a circuit through switch 21. On continued movement to the right of rod 23, spring 31 presses against the U-shaped portion 33 of spring 32 to act as a strain release to prevent injury to the parts in the same manner as explained above. The manual reset mechanism, which includes pin 37, spring 38, and lever 35, may be utilized to manually reset the electrical switch to an open circuit position by depressing pin 37. The switching device shown as reference numeral 21 is available in two models. In the present disclosure, a circuit is initiated when the actuating stem 34 is moved to the right, and the circuit is terminated when the actuating stem is moved to the left. This arrangement may be changed if required by the particular use to which the device is applied by substituting a reverse acting switch.

Considering now the connection between the pressure motor, composed of bellows 17 and return spring 25, and the actuating stem 34 of switch 21, it will be evident that rod 23 and lever 30 form a fairly rigid positive acting linkage which through its loose connection with actuating stem 34 is capable of floating movement in each direction. Minor variations in the structural features of bellows 17 and/or spring 25, may be corrected by adjusting the position of block 28, which is threadedly mounted on rod 23, and after these adjustments are made block 28 may be secured in its position by locknut 27. However, another way of correcting for these variations is shown in the modification disclosed in Figure 5. Here the main operating lever is shown as a split lever formed by riveting two resilient strips 64 and 65 together with an adjusting screw 67 positioned between their end portions. By spreading the end portions with the adjustment screw 67, an excessive spring rate of spring 25 and/or bellows 17 may be corrected. Likewise, a subnormal spring rate of spring 25, and/or bellows 17, may be corrected by loosening the adjustment screw 67 to permit the split blade to assume the dimensions of a single member.

Since disks 43 and 50 are rotatable about rod 40, the limit of movement of the end portion 30a of lever 30 or the split end portions 64a and 65a of lever 63, and consequently the amount of lost motion which either of these members is capable of having is controlled by rotation of the two disks on rod 40. Thus as long as minor variations of pressure within bellows 17 occur the end portion of the main operating lever which projects between the cam surfaces 44 and 52 is capable of free movement within the slotted area 51 without actuating the switch. However, when the movement of the pressure motor in either direction is sufficient to cause the projecting end of the main lever to be brought into engagement with either of the cam surfaces 44 or 52, continued movement of the pressure motor in that direction causes the main operating lever to be pivoted on the crossed reeds 29, and the actuating stem 34 is then made to move in one direction or the other.

It will be apparent to those skilled in the art that numerous modifications may be made in the invention and in the shape and size of the members disclosed herein, and therefore I do not wish to be restricted to the specific disclosure but rather to the extent of the appended claims.

I claim as my invention:

1. In a control device, in combination, a two-position electric switch, a pressure motor comprising a bellows and a resilient means opposing movement of said bellows, a floating lever for transmitting movement from said pressure motor to said switch, two rotatable cam members mounted on a common axis of rotation cooperable with said lever for actuating said switch in response to a predetermined movement of said pressure motor, and adjusting means associated with said lever to compensate for variations in the calibration of said pressure motor.

2. A control device, comprising, a pressure motor, a switch operably controlled by said pressure motor, two rotatably adjustable stop members mounted on a common axis of rotation for setting the maximum and minimum pressures at which said pressure motor is operable to actuate said switch, a lever member connected to said pressure motor cooperable with said stop members for actuating said switch, including, two members longitudinally joined for a portion of their length and separated for the remainder of their length, and an adjusting member positioned between the separated portions of said lever for adjusting the distance between said separated portions to compensate for variations in the construction of said pressure motor.

3. In a control device, comprising, a pressure motor, a switch operably controlled by said pressure motor, two adjustable stop members for setting the maximum and minimum pressures at which said pressure motor is operable to actuate said switch, a lever member connected to said pressure motor cooperable with said stop members for actuating said switch, comprising, two resilient members longitudinally joined for a portion of their length and separated for the remainder of their length, and an adjusting member positioned between the separated portions of said lever for adjusting the distance between said separated portions to compensate for variations in the construction of said pressure motor.

4. In a control device, in combination, a two-position electric switch of the type which tends to remain in the position to which it is actuated, a pressure motor adapted for connection to a source of fluid pressure being operable to actuate said switch to one of its positions upon a predetermined variation of fluid pressure in one direction, biasing means associated with said pressure motor operable to actuate said switch to another of its positions upon a predetermined variation of fluid pressure in a second direction, adjustable stop means for adjusting the limit at which said pressure motor and said biasing means are operable to actuate said switch to either of its two positions, and a switch actuating lever operably connected to said pressure motor and biasing means, said lever having an adjustable portion cooperable with said stop means to compensate for variations in the calibration of said pressure motor or said biasing means.

5. In a control device, a support, condition responsive means, a floating lever, means connecting said condition responsive means and a first portion of said lever, switching means operatively connected to a second portion of said lever, a pair of adjustable stops for limiting movement in two directions of a third portion of said lever, means associated with the third portion of said lever for varying the distance between the points of contact of said lever and each of said adjustable stops, indicia positioned with each of said adjustable stops, and cooperating indicia on said support.

6. In a control device, a support, condition responsive means, a floating lever, means connecting said condition responsive means and a first portion of said lever, means for adjusting the effective length of said connecting means, switching means operatively connected to a second portion of said lever, a pair of adjustable stops for limiting movement in two directions of a third portion of said lever, means associated with the third portion of said lever for varying the distance between the points of contact of said lever and each of said adjustable stops, indicia positioned with each of said adjustable stops, and cooperating indicia on said support.

7. In a control device, a support, a switch, condition responsive means, a pivoted lever interconnecting said switch and said condition responsive means, means determining the position of the pivot of said lever for determining the condition value at which said switch is actuated comprising a manually adjustable cam member pivoted in said support, said cam member being laterally resilient and having an extension biased by said resiliency into engagement with an arcuate edge surface of said support for maintaining said cam in its adjusted position, indicia on said cam extension, and cooperating indicia on said support.

8. In a control device, a switch, an actuator for said switch having a limited range of movement, a lever connected to said actuator, pivot means for said lever, a condition responsive device, a first spring having one portion carried by said lever and another portion biased into engagement with said lever, a second spring having one portion carried by said lever and another portion biased into engagement with said first spring, flexible means connecting said condition responsive device and said second spring, said flexible means acting in compression to separate said springs after moving said lever to one limit of its range of movement as determined by said switch actuator and acting in tension to separate said first spring from said lever after moving said lever to the other limit of its range of movement as determined by said switch actuator.

9. In a control device, a support, a switch, condition responsive means, a mechanical linkage interconnecting said condition responsive means and said switch including a cam for determining the condition value at which said switch is actuated to one of its operative positions, said cam being laterally resilient and having an integral manually positionable extension biased by said resiliency into engagement with an arcuate edge surface of said support for maintaining said cam in its adjusted position.

10. In a control device, a support, a switch, condition responsive means, a mechanical linkage interconnecting said condition responsive means and said switch including a cam for determining the condition value at which said switch is actuated to one of its operative positions, said cam being laterally resilient and having an integral manually positionable extension biased by said resiliency into engagement with an arcuate edge surface of said support for maintaining said cam in its adjusted position, indicia on said cam extension, and cooperating indicia on said support.

ADOLF P. SIMSON.

REFERENCES CITED

The following references are of record in the file of this patent:

UNITED STATES PATENTS

| Number | Name | Date |
| --- | --- | --- |
| 2,233,018 | Lindemann | Feb. 25, 1941 |
| 2,291,501 | Persons | July 28, 1942 |
| 2,298,795 | Jusdon | Oct. 23, 1942 |
| 2,377,503 | Kronmiller | June 5, 1945 |
| 2,394,714 | Newton | Feb. 12, 1946 |